United States Patent [19]

Horan et al.

[11] Patent Number: 4,713,255

[45] Date of Patent: Dec. 15, 1987

[54] EMULSIFICATION SYSTEM FOR CREAMY CHEESE FOOD PRODUCTS

[75] Inventors: William J. Horan, Dover, Del.; Jeffrey M. Schweid, Haverhill, Mass.

[73] Assignee: General Foods Corporation, White Plains, N.Y.

[21] Appl. No.: 938,700

[22] Filed: Dec. 5, 1986

Related U.S. Application Data

[63] Continuation-in-part of Ser. No. 718,395, Apr. 1, 1985, abandoned.

[51] Int. Cl.⁴ ................................................. A23L 1/24
[52] U.S. Cl. .................................. 426/589; 426/607; 426/613; 426/654
[58] Field of Search ............... 426/589, 607, 613, 654

[56] References Cited

U.S. PATENT DOCUMENTS

| | | | |
|---|---|---|---|
| 3,582,362 | 6/1971 | Drews et al. | 426/613 |
| 4,034,122 | 7/1977 | Patterson | 426/654 |
| 4,107,335 | 8/1978 | Glickstein et al. | 426/613 |
| 4,352,832 | 10/1982 | Wood | 426/589 |
| 4,423,084 | 12/1983 | Trainor et al. | 426/589 |
| 4,510,166 | 4/1985 | Lenchin et al. | 426/589 |
| 4,539,215 | 9/1985 | Schweid et al. | 426/613 |

*Primary Examiner*—Jeanette Hunter
*Attorney, Agent, or Firm*—Sam D. Walker; Thomas R. Savoie; Daniel J. Donovan

[57] ABSTRACT

A dry mix which contains an emulsification system including a combination of Polysorbate 60 and dextrin can be used to produce a creamy cheese and stable fluid emulsion by hand shaking the dry mix with a low aqueous phase and an oil phase. The amount of shaking required to produce a stable oil-in-water emulsion is much reduced as compared to other emulsification systems.

6 Claims, No Drawings

EMULSIFICATION SYSTEM FOR CREAMY CHEESE FOOD PRODUCTS

This application is a continuation-in-part of Ser. No. 718,395 filed Apr. 1, 1985, now abandoned.

TECHNICAL FIELD

Dry salad dressing mixes to be used in the home preparation of fluid salad dressings have received wide acceptance in the marketplace. These mixes are an economical alternative to prepared, bottled salad dressings which are both expensive to package and distribute and bulky to transport and store. Dry salad dressing mixes have the ability to be used in the preparation of fresh dressings which are prepared at the point of consumption at such time and in such quantity as may be desired. The dry dressing mix will be combined with an aqueous phase, such as vinegar and water or buttermilk and an oil phase, such as a vegetable oil or mayonnaise, to form a liquid or fluid dressing. These ingredients will typically be mixed in a jar or cruet by manual shaking of the container in order to form an emulsion. Dressings prepared from dry mixes may contain dry flavor systems which impart a higher flavor impact to the freshly-prepared dressing than found in most bottled dressings.

Non-creamy (i.e., non-opaque) salad dressings, such as Italian dressing, may be prepared by combining a dry salad dressing mix, typically containing dried spices and vegetables and thickener (e.g. vegetable gums) with vinegar, water and salad oil. These relatively non-viscous salad dressings are not expected by the consumer to be stable emulsions. These dressings, even when marketed as bottled dressing, contain little or no emulsifier, readily separate into oil and aqueous phases in the bottle and are intended to be shaken by the consumer immediately prior to each use. Dry mixes for Italian-type dressings which typically contain dried spices and vegetables and a thickener, such as a vegetable gum or comparable hydrocolloid, and which are typically prepared by shaking with vinegar, water and oil, likewise do not contain an emulsifier and separate soon after shaking.

Opaque or creamy salad dressings, such as most cheese-containing dressings and those dressings designated as creamy-French, creamy-Italian and the like, are, however, expected to be relatively-uniform in consistency and not quickly separate into distinct phases. Opaque or creamy salad dressings which are marketed as bottled dressings will typically contain both emulsifiers and stabilizers and will be processed with the aid of mechanical homogenizers. The ability to employ a homogenization step enables a stable emulsion to be produced using a wide variety of emulsifiers and stabilizers. If a stable creamy salad dressing containing cheese solids is desired from dry salad dressing mixes, it is necessary to employ an emulsification-stabilization system wherein the dispersed cheese solids will remain emulsified and will not separate in low aqueous medium. To date, the art is not aware of such a system.

The object of the present invention is, therefore, to produce a dry salad dressing mix.

Another object of the present invention is to produce a dry salad dressing mix that can be used to form a stable, viscous and creamy, cheese salad dressing.

A further object of the present invention is to produce an emulsion system for a dry salad dressing mix containing cheese solids which will remain an emulsion and will not separate at low aqueous levels.

It would be highly desirable to produce a dry salad dressing mix that can be used to form a stable, viscous, creamy cheese salad dressing with the addition of an aqueous and an oil phase using a minimum amount of shaking or shear.

SUMMARY OF THE INVENTION

The present invention is also concerned with a dry mix for combining with an aqueous and an oil phase in order to make a creamy cheese emulsion with mild handshaking wherein said aqueous phase is at low levels comprising a first part consisting of spices, salt, cheese flavors, sugars, sodium citrate and monosodium glutamate together with polysorbate 60, and a second part consisting of cheese flavor, cheese solids and gums, together with dextrin.

Further, the present invention is concerned with a process for preparing a dry salad dressing mix containing cheese solids which makes a creamy cheese salad dressing with mild hand shaking and will remain an emulsion and not separate at low aqueous levels comprising: blending a first part comprising spices, salt, cheese flavoring, sugar, sodium citrate and monosodium glutamate to form a uniform blend; contacting the uniformly blended first part with heated polysorbate 60 while mixing; blending a second part comprising cheeve flavors containing about 40% whey solids, cheese containing about 60% cheese solids, gums and dextrin to form a uniform blend; combining the uniformly blended first part with the uniformly blended second part and mixing to form a homogeneous mixture.

DETAILED DESCRIPTION

An emulsification system to Polysorbate 60 (polyoxyethylene 20 sorbitan tristearate), and dextrin have been found to be particularly effective for producing a stable, creamy cheese and viscous oil-in-water emulsion with a minimum of shear. This emulsification system is so effective that a stable, oil-water emulsion can be produced in a cruet-type container at low aqueous levels using only several seconds of hand shaking. The emulsification system is highly suitable for being combined with dry spices, dry vegetables, cheese solids, flavor and color ingredients for the production of a dry salad dressing mix.

The emulsification system of this invention contains on a dry weight ratio basis of polysorbate 60:dextrin of 1.3:8.5 to 2.5:10.5. A more preferred weight ratio is 1.83:9.45. Preferably the emulsification system consists essentially of these two ingredients.

The Polysorbate 60 compound is a hydrophilic emulsifier well-known in the food art and available from several different suppliers. Dextrin is a hydrolyzed cereal solid prepared from the acid or enzymatic conversion of starch. In the present invention, the dextrin has a DE ranging from 8–14 and preferably about 10.

In order to produce a stable cheese emulsion, the emulsion system of this invention must be combined with the other dry mix ingredients in a particular manner. A first part comprising spices, salt, cheese flavoring containing no cheese solids, sugar, sodium citrate and monosodium glutamate are first blended to form a uniform dry blend. Polysorbate 60, being semi-solid at room temperature, is heated to a liquid and plated onto the surface of the uniform dry blend while mixing. The weight ratio of the first part and polysorbate 60 is 55:1.3 to 60:2.5, and preferably 58.72:1.85. A uniform blended second part comprising cheese flavorings containing up to 50% whey solids and preferably from 35 to 45% whey solids but no cheese solids; cheese containing up to 70% cheese solids and preferably from 55 to 65% cheese solids; and gums is combined with dextrin and thoroughly mixed. The purpose of the dextrin is to disperse the cheese solids. The amount of dextrin can vary depending on the amount of cheese solids present, i.e. if there is no cheese solids present then there will be no need to add dextrin. Care must be taken, however, to make sure that sufficient amounts of dextrin is added to the uniformily blended second part containing cheese solids. If too little dextrin is added, the cheese solids will not be adequately dispersed, resulting in the formation of lumps, thereby affecting the formation of a stable emulsion. If too much dextrin is added, the emulsion would break after a few minutes. The weight ratio of the second part and dextrin ranges from 39:8.5 to 40:10.5 and preferably 39.4:9.5. The blended second part is then combined with the coated first part and thoroughly mixed to form a homogeneous mixture.

To achieve the stable, creamy, cheesy emulsion at a low aqueous level, the weight ratio of the first part coated with polysorbate 60 and the second part containing dextrin is 60.55:39.45. By low aqueous medium is meant that the level of water-vinegar is decreased by up to 15% and preferably from 12 to 15%.

Generally, the dry mix creamy cheese salad dressing separate when the level of vinegar and water is decreased by more than 15%. When the natural cheese ingredients were added and blended in any other than the prescribed manner, the emulsion will break.

The dry mix, in addition to the emulsification system of this invention, may also include various solids which are present to achieve the desired taste, color, etc. These solids, in the case of dry salad dressing mixes, may include salt, sugar, pepper, garlic, onion and other species and seasoning, cheese flavors, cheese solids, caramel and other colors, monosodium glutamate, red pepper granules, green onions, sodium citrate, etc. The dry mix may also contain minor amounts of ingredients such as flow agents (e.g., tricalcium phosphate, sodium silico aluminate, silicon dioxide), preservatives (e.g. butylated hydroxy anisole, tertiary butylhydroquinone, sodium benzoate, sorbic acid, ethylenediaminetetraacetic acid), etc. While minor amounts of other ingredients such as starch or additional emulsifiers or gums may be added to the dry mix they are not necessary to obtain a stable viscous emulsion which can be prepared with a minimum of shear or agitation.

The dry mix of this invention is prepared into a stable dressing by being mixed in a suitable container with an aqueous phase and an oil phase. This mixing can be accomplished in either one or two steps by relatively mild hand shaking of the ingredients in a suitable container. The dry mix may be mixed first with the aqueous phase and then this aqueous mixture combined with the oil phase. Alternatively, the dry mix, and aqueous and oil phases may be mixed in one step.

By stable what is meant is that the oil and aqueous phases do not separate for several weeks after mixing, and by viscous what is meant is that the viscosity is at least about 1400 to 2400 centipoises within 30 minutes after mixing. The aqueous phase preferably comprises water and/or vinegar (preferably about a 2 to 1 ratio of vinegar to water), while the oil phase can be any edible oil suitable for the desired end product. The suitable oils include vegetable oils such as peanut oil, soybean oil, corn oil, olive oil, palm oil, coconut oil, sunflower oil, safflower oil, cottonseed oil, spices, dried vegetables, flavor and color agents, etc. and mixtures thereof. While the ratio of aqueous phase to oil phase can vary dependent upon the desired end product, preferably it is within the range of about 3 to 5 and 5 to 3 parts by volume.

EXAMPLE 1

A dry mix creamy cheese salad dressing mix using the ingredient listed below was produced by blending all of the ingredients and then spraying heated polysorbate 60 onto the dry blend.

| Ingredient | Weight % |
|---|---|
| Salt | 12.74 |
| Ground Garlic | 10.96 |
| Sodium Citrate | 9.13 |
| Ground Onions | 7.31 |
| Sugar | 7.12 |
| Italian Cheese Flavor (No Cheese Solids) | 4.57 |
| Pepper | 2.28 |
| Red Bell Pepper Granules | 2.10 |
| Monosodium Glutamate | 1.37 |
| Green Onions | 1.14 |

The amount of polysorbate 60 added was 1.83%. A second mix using the ingredients listed below was produced by blending all of the ingredients.

| Ingredient | Weight % |
|---|---|
| Parmesan Cheese Flavor (40% Whey Solids) | 15.84 |
| Zesty Cheese (60% Cheese Solids) | 11.42 |
| Corn Dextrin | 9.45 |
| Xanthan Gum | 1.37 |
| Cellulose Gum | 1.37 |

The first part coated with polysorbate 60 and second part containing dextrin, were combined at a ratio of 60.55 to 39.45 and thoroughly blended.

About 21.9 grams of the above mix was combined in a cruet with 90 mls. of vinegar and 67 mls. water, and shaken by hand for 10 seconds. Salad oil in an amount of 135 mls. was added to the mixture and the mixture further shaken for an additional 10 seconds. A creamy cheese salad dressing was formed. This emulsion remained stable for at least one month at refrigerator temperatures.

We claim:

1. A process for preparing a dry mix salad dressing containing cheese solids which makes a creamy cheese salad dressing with mild hand shaking and will remain in emulsion and not separate at up to 15% reduction in the aqueous phase, comprising:
   (a) blending spices, salt, cheese flavoring containing no cheese solid, sugar, sodium citrate and monosodium glutamate to form a uniform first part;
   (b) contacting the blended first part with heated polysorbate 60 while mixing;
   (c) blending cheese flavoring containing up to 50% whey solids; cheese containing up to 70% cheese solids, gums and dextrin in an amount sufficient to disperse the cheese solids to form a uniform second part;

(d) combining the blended first part with the blended second part and mixing to form a homogeneous mixture, wherein the weight ratio of the first part contacted with polysorbate 60 and the second part combined with dextrin is 60:55 to 39:45.

2. A process according to claim 1 wherein the weight ratio of the first part to polysorbate 60 is 55:1.3 to 60:2.5.

3. A process according to claim 1 wherein the weight ratio of the second part to dextrin is 39:8.5 to 40:10.5.

4. A process according to claim 1 wherein the cheese flavoring contains from 35 to 45% whey solids.

5. A process according to claim 1 wherein the cheese contains from 55 to 65% cheese solids.

6. A product produced according to the process of claim 1.

* * * * *